United States Patent
Yoshikawa et al.

(10) Patent No.: US 6,710,493 B2
(45) Date of Patent: Mar. 23, 2004

(54) DYNAMO-ELECTRIC MACHINE HAVING TAPERED MAGNETS SECURED TO YOKE

(75) Inventors: Shouichi Yoshikawa, Hoi-gun (JP); Takeo Noda, Hamana-gun (JP); Akihiko Suzuki, Toyohashi (JP); Yasushi Ueda, Toyohashi (JP); Toshimoto Ito, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/155,019

(22) Filed: May 28, 2002

(65) Prior Publication Data

US 2003/0001449 A1 Jan. 2, 2003

(30) Foreign Application Priority Data

Jun. 29, 2001 (JP) ......................... 2001-199999

(51) Int. Cl.$^7$ .................. H02K 21/26; H02K 21/38; H02K 23/04
(52) U.S. Cl. ................. 310/154.08; 310/154.21; 310/154.12; 310/154.01
(58) Field of Search ............ 310/154.01, 154.21, 310/154.08, 154.12

(56) References Cited

U.S. PATENT DOCUMENTS

| | | | | |
|---|---|---|---|---|
| 4,341,969 A | * | 7/1982 | Sievert | 310/154.21 |
| 4,777,717 A | * | 10/1988 | Okamoto et al. | 310/154.08 |
| 5,105,113 A | * | 4/1992 | Ishikura et al. | 310/154.29 |
| 5,162,684 A | * | 11/1992 | Hayakawa | 310/154.28 |
| 5,206,556 A | * | 4/1993 | Hayakawa | 310/154.28 |
| 5,358,341 A | * | 10/1994 | Blaettner et al. | 310/90 |
| 5,660,786 A | | 8/1997 | Ledran | |
| 6,509,662 B2 | * | 1/2003 | Suzuki et al. | 310/154.22 |

FOREIGN PATENT DOCUMENTS

| | | | | |
|---|---|---|---|---|
| JP | A-61-224852 | 10/1986 | | |
| JP | A-62-48246 | 3/1987 | | |
| JP | A-62-166757 | 7/1987 | | |
| JP | 63277450 A | * 11/1988 | ......... | H02K/21/08 |
| JP | A-1-298934 | 12/1989 | | |
| JP | 04026338 A | * 1/1992 | ............ | H02K/1/27 |
| JP | A-4-261352 | 9/1992 | | |
| JP | 4261352 | * 9/1992 | ......... | H02K/23/04 |
| JP | U-5-9177 | 2/1993 | | |
| JP | A-5-111204 | 4/1993 | | |
| JP | A-7-203665 | 8/1995 | | |
| JP | A-9-163646 | 6/1997 | | |
| JP | A-9-182326 | 7/1997 | | |
| JP | A-9-285047 | 10/1997 | | |
| JP | A-10-108430 | 4/1998 | | |
| JP | A-11-18390 | 1/1999 | | |
| JP | A-11-98799 | 4/1999 | | |
| JP | A-11-178301 | 7/1999 | | |

OTHER PUBLICATIONS

J.R. Hendershot Jr. and T.J. E. Miller, Design of Brushless Permanent–Magnet Motors, Magna Physics Publishing and Clarendon Press, Oxford 1994, Chapter 3.*

* cited by examiner

Primary Examiner—Thomas M. Dougherty
Assistant Examiner—Yahveh Comas
(74) Attorney, Agent, or Firm—Posz & Bethards, PLC

(57) ABSTRACT

A rotor and each magnet are configured to satisfy one of the following conditions: $(D\pi/Z)Xn+T<X<(D\pi/Z)\times(n+1)-T$ and $(D\pi/Z)\times(n-1)+T<X<(D\pi/Z)Xn-T$. Here, Z is a number of cores. D is an outer diameter of the rotor. T is a circumferential dimension of a tooth of each core. X is a circumferential dimension between a circumferentially innermost one of first and second opposing points of a first tapered portion and a circumferentially innermost one of first and second opposing points of a second tapered portion. The first and second opposing points radially oppose first and second imaginary end circles, respectively, defined by outer peripheral surfaces of the cores. Furthermore, n is the number of the teeth that are entirely placed within a range defined by X when a circumferential center of one of the teeth is radially opposed to a circumferential center of the range defined by X.

5 Claims, 14 Drawing Sheets

DYNAMO-ELECTRIC MACHINE HAVING TAPERED MAGNETS SECURED TO YOKE

CROSS REFERENCE TO RELATED APPLICATION

This application is based on and incorporates herein by reference Japanese Patent Application No. 2001-199999 filed on Jun. 29, 2001.

BACKGROUND OF THE INVENTION

1. Field of the Invention

The present invention relates to a dynamo-electric machine, such as a blower motor of a vehicle air conditioning system.

2. Description of Related Art

A motor, such as a blower motor of a vehicle air conditioning system, includes a yoke. A pair of curved magnets, which are curved to conform with an inner circumferential surface of the yoke, are secured to the inner circumferential surface of the yoke in diametrically opposed relationship to each other.

A rotor is rotatably received within the yoke. A drive shaft extends along a rotational axis of the rotor and is secured to the rotor to rotate integrally with the rotor. A predetermined number of cores are circumferentially arranged in the rotor at equal angular intervals. Each core has a rectangular plate tooth, which radially outwardly protrudes toward the yoke. A winding is wound around each tooth.

The blower motor of the vehicle air conditioning system is normally placed in a passenger cabin of a vehicle, so that the blower motor is required to achieve a relatively high degree of silence during rotation of the blower motor. Thus, rather than using ball bearings, which can relatively easily transmit vibrations from the rotor (armature), slide bearings made of a sintered metal material, which does not easily transmit vibrations from the rotor (armature), are commonly used to rotatably support the drive shaft of the blower motor of the vehicle air-conditioning system.

However, the slide bearing requires oil in a contacting portion, which makes sliding contact with the drive shaft of the motor. Thus, maintenance of the oil is required, and spill of the oil from the slide bearing could occur.

Furthermore, in the slide bearing, a washer or the like is required, causing an increase in the number of the components. This results in an increased complexity of the bearing structure of the motor and an increased complexity of the manufacturing steps of the bearing structure of the motor.

On the other hand, unlike the slide bearing, if the ball bearing is used in the bearing structure of the motor, the oil in the contacting portion, which makes sliding contact with the drive shaft of the motor, is not required. Thus, with use of the ball bearing, the disadvantages, which result from the maintenance of the oil or the spill of the oil, can be avoided, and the washers or the like are not required. This substantially simplifies the bearing structure of the motor and the manufacturing steps of the bearing structure of the motor.

The ball bearing can relatively easily transmit vibrations induced, particularly, by cogging torque of the rotor (i.e., torque generated in the rotor due to changes in attractive force and repulsive force between the magnets and the rotor). Thus, it is effective to reduce the cogging torque to reduce the vibrations of the rotor and to achieve a higher degree of silence during the rotation of the motor.

One way of reducing the cogging torque is to gradually reduce a wall thickness (radial dimension) of each magnet toward its circumferential ends. However, this measurement alone cannot reduce the cogging torque to an acceptable level, which allows use of the ball bearing in the blower motor of the vehicle air conditioning system.

Another way of reducing the cogging torque is to use a rotor having skewed cores. Although this measurement can reduce the cogging torque, it generally results in some disadvantages, such as a reduction in a winding surface area of each core, around which the winding is wound.

SUMMARY OF THE INVENTION

The present invention addresses the above disadvantages. Thus, it is an objective of the present invention to provide a dynamo-electric machine, which effectively reduces cogging torque.

To achieve the objective of the present invention, there is provided a dynamo-electric machine, which includes a yoke, a rotor and a plurality of curved magnets. The rotor is rotatably received in the yoke and includes a predetermined number of cores circumferentially arranged at substantially equal angular intervals, and each core includes a tooth, which radially outwardly extends toward the yoke. The magnets are secured to an inner circumferential surface of the yoke. Each magnet has first and second tapered portions, which are tapered in opposite circumferential directions. Each of the first and second tapered portions has axially opposed first and second tapered surfaces. An axial distance between the first tapered surface and the second tapered surface of each of the first and second tapered portions decreases toward an outer circumferential end of each of the first and second tapered portions. The first tapered surface of each of the first and second tapered portions has a first opposing point, which is radially opposed to a first imaginary end circle defined by outer peripheral surfaces of the cores at one axial ends of the cores. The second tapered surface of each of the first and second tapered portions has a second opposing point, which is radially opposed to a second imaginary end circle defined by the outer peripheral surfaces of the cores at the other axial ends of the cores. The rotor and each magnet are configured to satisfy one of the following conditions: $(D\pi/Z)Xn+T<X<(D\pi/Z)\times(n+1)-T$ and $(D\pi/Z)\times(n-1)+T<X<(D\pi/Z)Xn-T$, wherein Z is a number of the cores of the rotor, D is an outer diameter of the rotor, T is a circumferential dimension of each tooth, X is a circumferential dimension between a circumferentially innermost one of the first and second opposing points of the first tapered portion and a circumferentially innermost one of the first and second opposing points of the second tapered portion when each magnet is viewed from a radial direction, and n is the number of the teeth that are entirely placed within a range defined by X when a circumferential center of one of the teeth is radially opposed to a circumferential center of the range defined by X.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
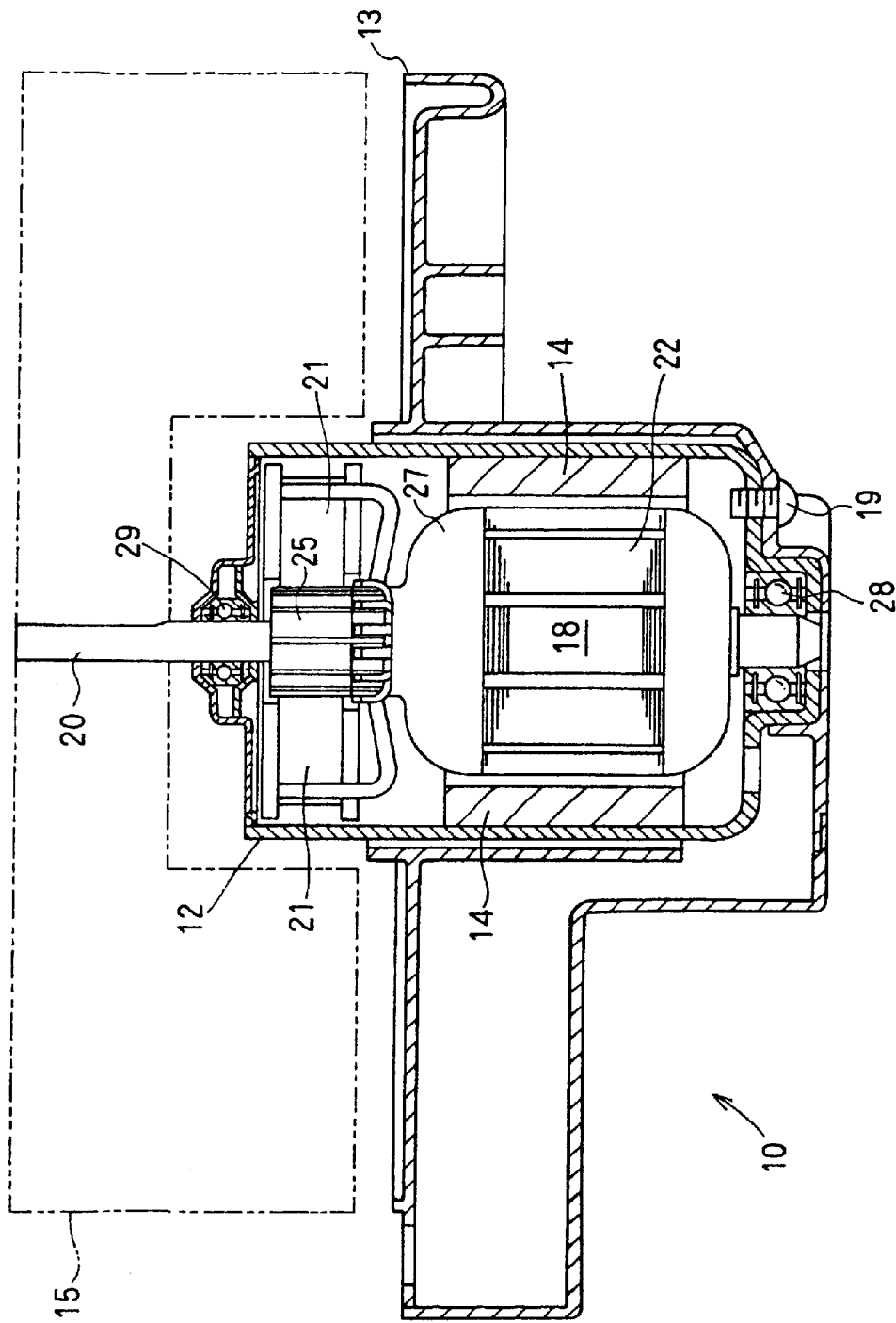
FIG. 1 is a cross sectional view of a motor according to an embodiment of the present invention.

A motor (acting as a dynamo-electric machine) according to an embodiment of the present invention will be described with reference to the accompanying drawings.

With reference to FIGS. 1 to 7, the motor 10 of the present embodiment is constructed as a blower motor of a vehicle air-conditioning system and has a cylindrical yoke 12. The yoke 12 is supported by a motor holder 13 and is secured to the motor holder 13 with screws 19.

A pair of curved magnets 14, which are curved to conform with an inner circumferential surface of the yoke 12, are secured to the inner circumferential surface of the yoke 12. The magnets 14 are diametrically opposed to each other and have substantially the same shape. A wall thickness (radial dimension) of each magnet 14 is gradually reduced toward circumferential ends of the magnet 14.

Figure 2A:
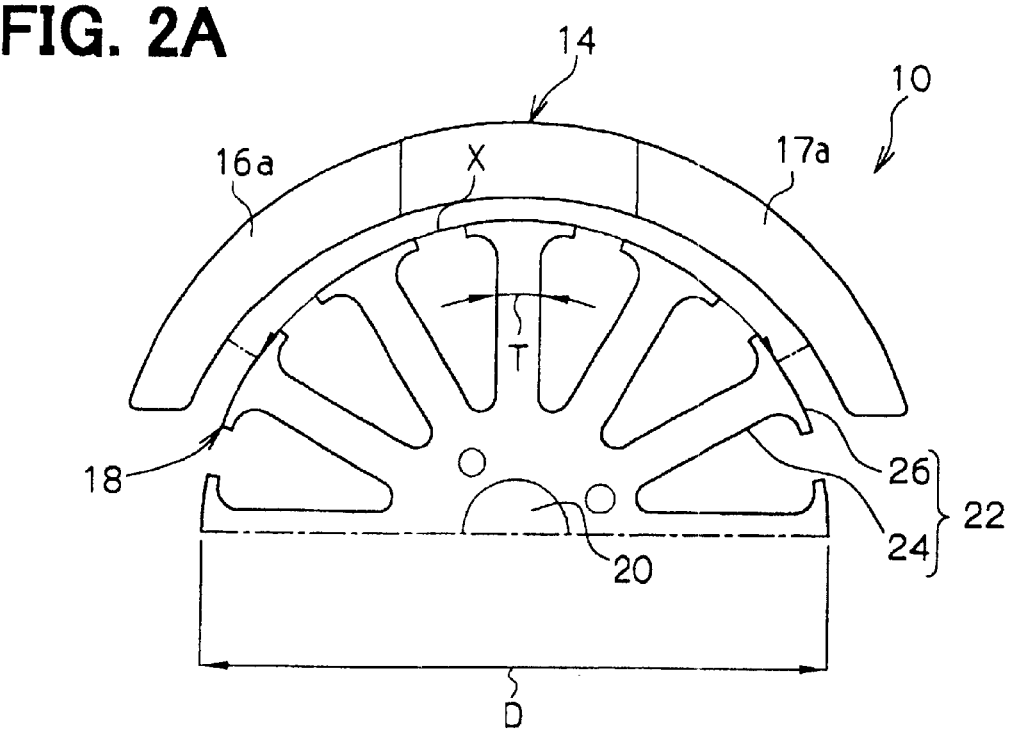
FIG. 2A is a partial plan view showing main features of the motor according to the embodiment.
Figure 2B:
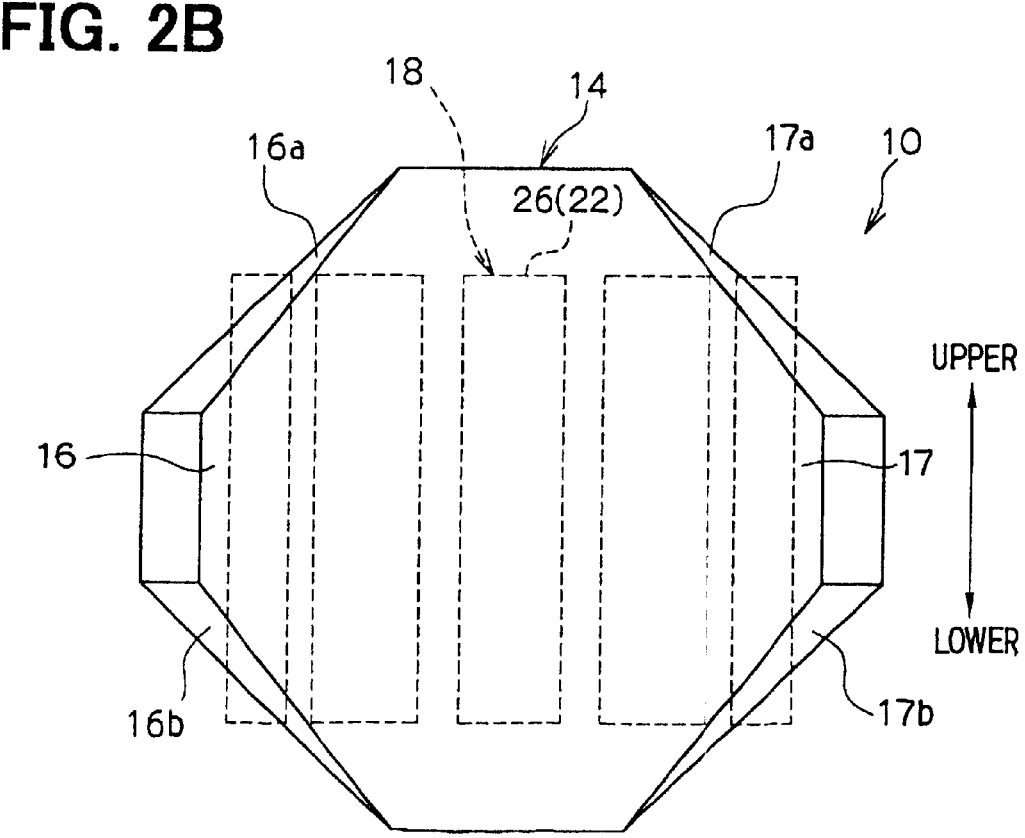
FIG. 2B is a partial side view showing a magnet of the embodiment.

As shown in FIG. 2B, each magnet 14 has first and second tapered portions 16, 17, which are tapered in opposite circumferential directions. The first tapered portion 16 has axially opposed first and second tapered planar surfaces 16a, 16b. Similarly, the second tapered portion 17 has axially opposed first and second tapered planar surfaces 17a, 17b. In each of the first and second tapered portions 16, 17, an axial distance between the first tapered surface 16a, 17a and the second tapered surface 16b, 17b gradually decreases toward an outer circumferential end of the tapered portion 16, 17. Furthermore, each magnet 14 is formed to be symmetrical with respect to a circumferential center line and also with respect to a vertical center line of the magnet 14.

A rotor 18 is rotatably received in the yoke 12. A drive shaft 20 extends along a rotational axis of the rotor 18 and is secured to the rotor 18 to rotate integrally with the rotor 18. The drive shaft 20 is rotatably supported by ball bearings 28, 29. A fan 15 is secured to a distal end of the drive shaft 20 to create air flow when electric current is supplied from an external power source, such as a vehicle battery, to the rotor 18 through brushes 21 and a commutator 25 to rotate the rotor 18. A predetermined number of cores 22 are arranged in the rotor 18 at equal angular intervals in a circumferential direction of the rotor 18. With reference to FIG. 2B, a vertical length (axial dimension) of each core 22 is greater than a vertical length (axial dimension) of each circumferential end surface of each magnet 14, and a vertical center (axial center) of each core 22 is at the same height (the same axial position) as a vertical center of each magnet 14.

Each core 22 includes a rectangular plate tooth 24, which radially protrudes toward the yoke 12. A winding 27 (FIG. 1) is wound around each tooth 24. It should be noted that the windings 27 are eliminated in the drawings except FIG. 1 for the sake of clarity. Furthermore, an extended portion 26 is formed in a distal end of each tooth 24. Each extended portion 26 extends in the circumferential direction on both circumferential sides of the tooth 24 to prevent detachment of the winding from the tooth 24.

Figure 4:
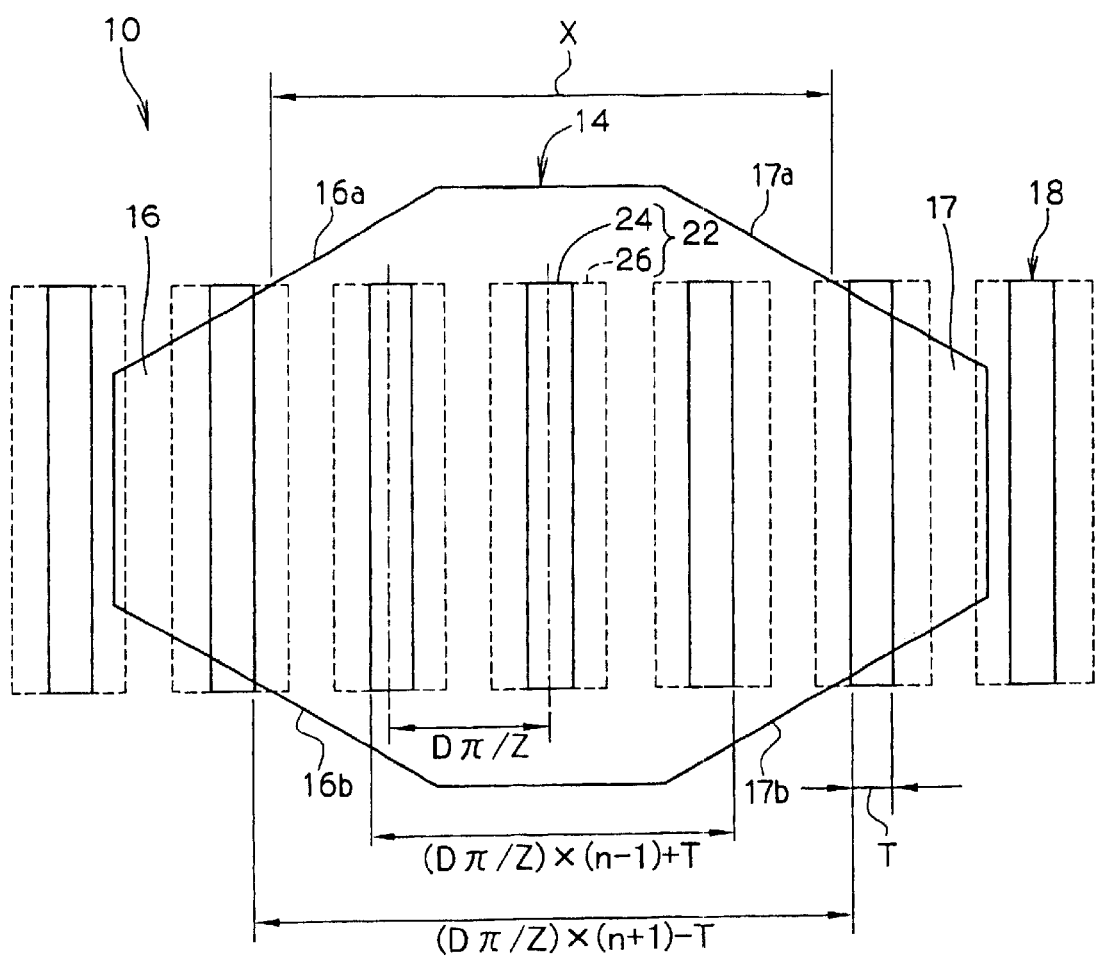
FIG. 4 is a developed view showing a state where one of teeth is centered on a circumferential center of a range X of a magnet, which is configured to satisfy a condition of $(D\pi/Z)Xn+T<X<(D\pi/Z)\times(n+1)-T$ according to the embodiment.

In this embodiment, the number of cores 22 (the number of slots) of the rotor 18 is represented by Z (in this embodiment, Z is twelve). Also, as shown in FIG. 2A, an outer diameter of the rotor 18 is represented by D (in this embodiment, D is 44.7 mm), and a width (circumferential dimension) of each tooth 24 in the circumferential direction is represented by T (in this embodiment, T is 2.4 mm). With reference to FIG. 4, the first tapered surface 16a of the first tapered portion 16 has a first opposing point, which is radially opposed to a first imaginary end circle defined by outer peripheral surfaces of the cores 22 at one axial ends of the cores 22. In FIG. 4, the first imaginary end circle is defined to extend along the upper ends of the cores 22. The second tapered surface 16b of the first tapered portion 16 has a second opposing point, which is radially opposed to a second imaginary end circle defined by the outer peripheral surfaces of the cores 22 at the other axial ends of the cores 22. In FIG. 4, the second imaginary end circle is defined to extend along the lower ends of the cores 22. Likewise, the first tapered surface 17a of the second tapered portion 17 has a first opposing point, which is radially opposed to the first imaginary end circle defined by the outer peripheral surfaces of the cores 22 at the one axial ends of the cores 22. The second tapered surface 17b of the second tapered portion 17 has a second opposing point, which is radially opposed to the second imaginary end circle defined by the outer peripheral surfaces of the cores 22 at the other axial ends of the cores 22. When each magnet 14 is viewed from a radial direction, a circumferential dimension between a circumferentially innermost one of the first and second opposing points of the first tapered portion 16 and a circumferentially innermost one of the first and second opposing points of the second tapered portion 17 is represented by X. The circumferential dimension X can be measured along an inner peripheral surface of each magnet 14. Alternatively, the circumferential dimension X can be measured along the outer peripheral surfaces of the cores 22 as a circumferential dimension between one point, which radially opposes the circumferentially innermost one of the first and second opposing points of the first tapered portion 16, and another point, which radially opposes the circumferentially innermost one of the first and second opposing points of the second tapered portion 17, as shown in FIG. 2A. The number of the teeth 24, which are entirely placed within a range defined by X when a circumferential center of one of the teeth 24 is radially opposed to a circumferential center of the range defined by X, is represented by n (n is an integer, which is equal to or greater than 1 but is equal to or less than Z, and n in this embodiment is three). The rotor 18 and the magnets 14 are configured to satisfy one of the following conditions: $(D\pi/Z)Xn+T<X<(D\pi/Z)\times(n+1)-T$ in the case of FIGS. 4 and 5 and $(D\pi/Z)\times(n-1)+T<X<(D\pi/Z)Xn-T$ in the case of FIGS. 6 and 7.

Operation of the present embodiment will be described.

In each of the first and second tapered portions 16, 17 of each magnet 14, the axial distance between the first tapered surface 16a, 17a and the second tapered surface 16b, 17b gradually decreases toward the outer circumferential end of the tapered portion 16, 17. Thus, magnetic attractive force or repulsive force between the magnets 14 and the rotor 18 does not abruptly change during the rotation of the rotor 18, and thus the cogging torque generated in the rotor 18 is advantageously reduced.

Figure 3:
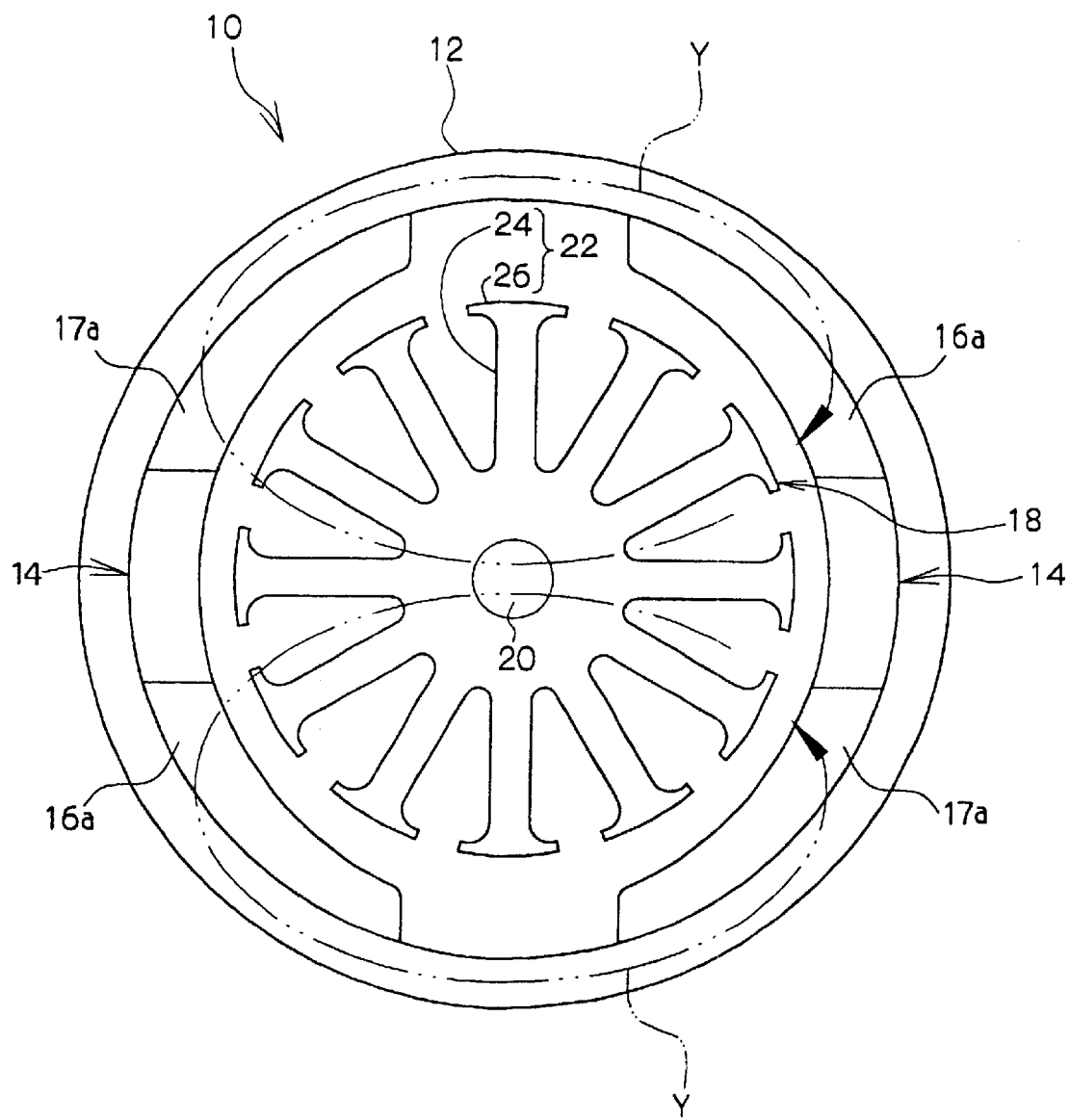
FIG. 3 is a schematic plan view showing main features of the motor according to the embodiment.

With reference to FIG. 3, in the motor 10 according to the present embodiment, the magnetic flux generated from the magnets 14 forms a magnetic circuit Y, which flows in the yoke 12 and the cores 22 of the rotor 18. Thus, when the cores 22 are symmetrically arranged with respect to the center of the range X of the magnet 14, and none of the teeth 24 of the cores 22 faces the circumferential ends of the range X of the magnet 14, the magnetic flux, which flows in the teeth 24 that face the range X of the magnet 14, is stabilized. Furthermore, when the rotor 18 is rotated from this stable state of the magnetic flux where the magnetic flux is stabilized, the magnetic flux changes (i.e., decreases and increases) until the rotor 18 is rotated to the next stable state, causing generation of the cogging torque due to the variation of the magnetic flux.

Figure 16:
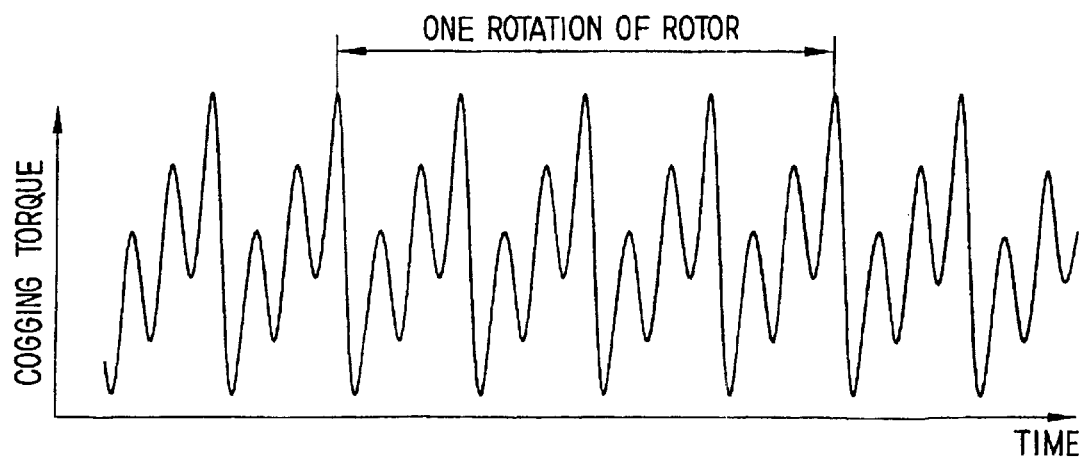
FIG. 16 is a graph showing a rotated time period of the rotor and a generated cogging torque in the first or second comparative example.

The stable state of the magnetic flux normally occurs once per $2\pi/Z$ (i.e., one slot) rotation of the rotor 18, and the magnetic flux varies or changes during an interval between the two successive stable states to cause generation of the cogging torque (FIG. 16).

Figure 8:
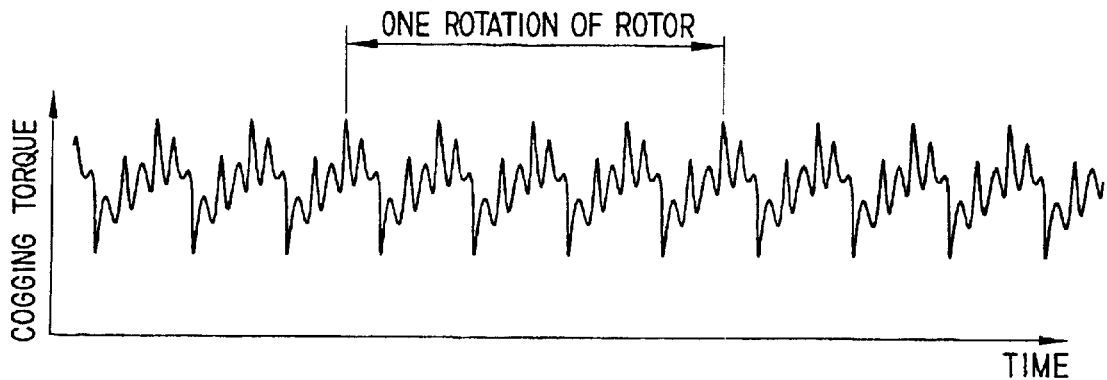
FIG. 8 is a graph showing a relationship between rotated time period of the rotor and a generated cogging torque in the embodiment.

With reference to FIG. 8, when the stable state of the magnetic flux occurs twice per $2\pi/Z$ (i.e., one slot) rotation of the rotor 18, the variation of the magnetic flux between the two successive stable states is divided and is thus advantageously reduced to further reduce the cogging torque (in this case, the cogging torque is reduced to one half of the cogging torque generated in the above case where the stable state of the magnetic flux occurs once per $2\pi/Z$ rotation of the rotor 18). The minimum points in the graph of FIG. 8 show the stable states of the magnetic flux.

Figure 6:
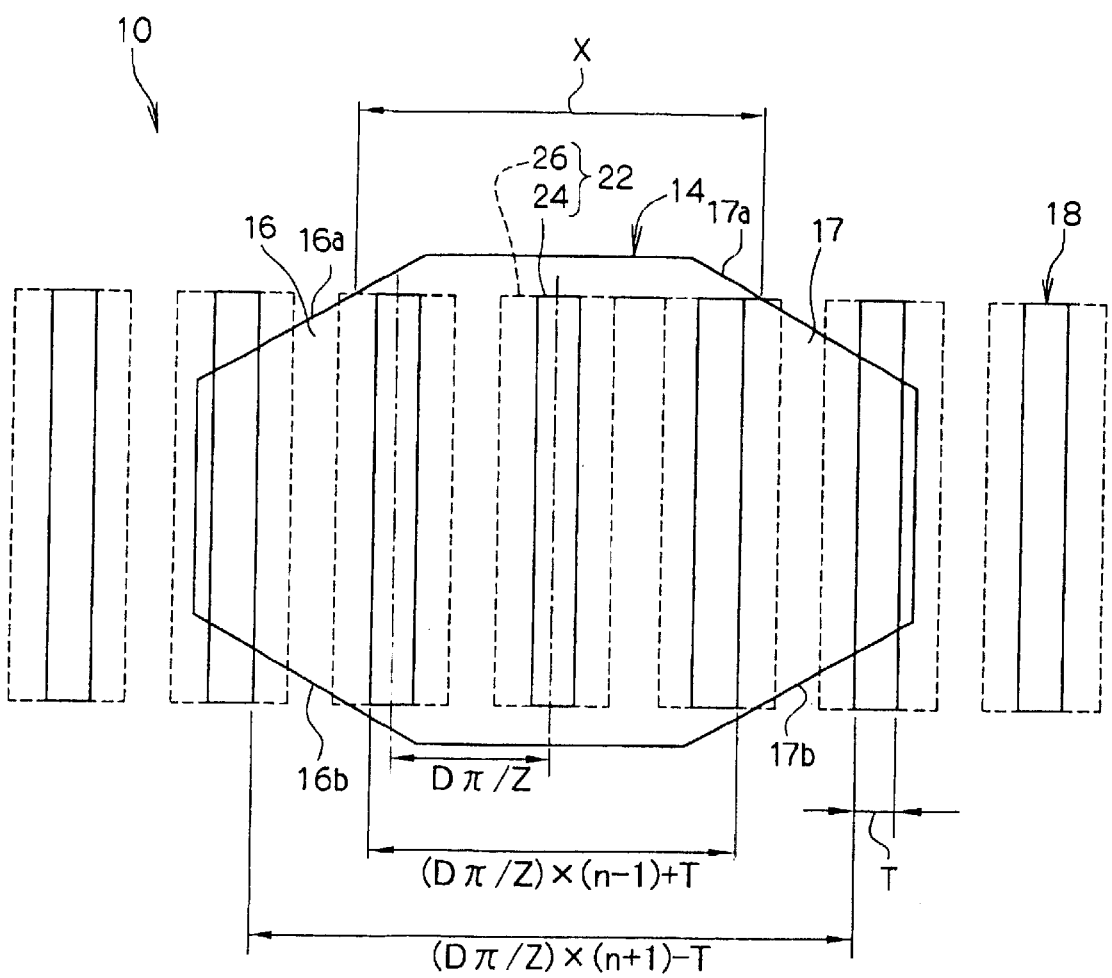
FIG. 6 is a developed view showing a state where one of teeth is centered on a circumferential center of a range X of a magnet that is configured to satisfy a condition of $(D\pi/Z)\times(n-1)+T<X<(D\pi/Z)Xn-T$ according to the embodiment.

With reference to FIGS. 4 and 6, when one of the teeth 24 is centered on the circumferential center of the range X of the magnet 14, the number of the teeth 24, which are entirely placed within the range X of the magnet 14, is n, and none of the teeth 24 faces the circumferential ends of the range X of the magnet 14. This is achieved by satisfying the following condition (condition for stabilizing the magnetic flux) of equation 1.

$$(D\pi/Z)\times(n-1)+T<X<(D\pi/Z)\times(n+1)-T \quad \text{equation (1)}$$

Figure 5:
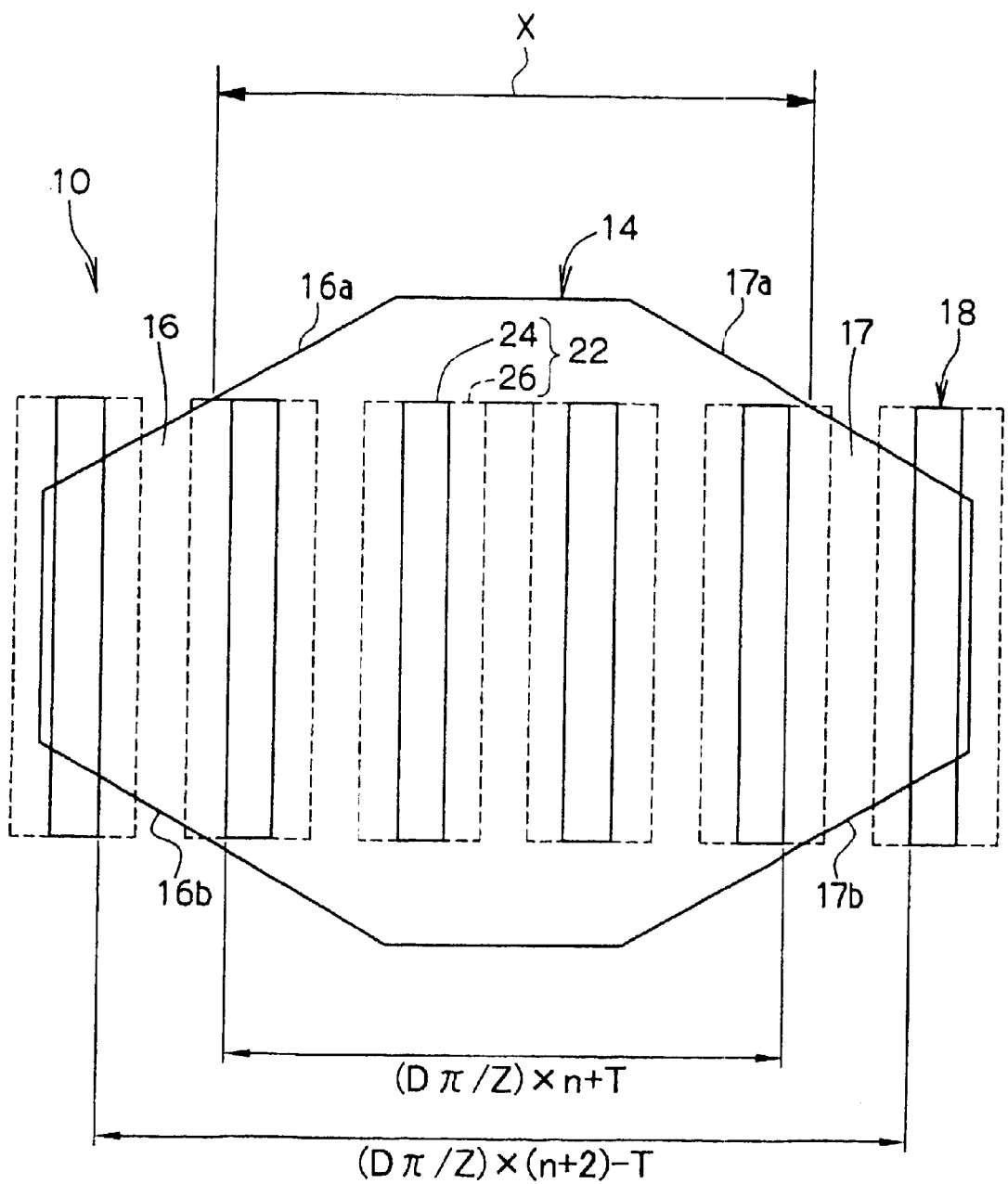
FIG. 5 is another developed view showing a state where the rotor is rotated to make $\pi/Z$ rotation from the state shown in FIG. 4.

Then, in the one case shown in FIG. 5, when the rotor 18 is rotated to make $\pi/Z$ (i.e., one half slot) rotation from the above state shown in FIG. 4 where the one of the teeth 24 is centered on the circumferential center of the range X of the magnet 14, the number of the teeth 24, which are entirely placed within the range X of the magnet 14, is n+1, and none of the teeth 24 faces the circumferential ends of the range X of the magnet 14. This is achieved by satisfying the following condition (condition for stabilizing the magnetic flux) of equation 2.

$$(D\pi/Z)Xn+T<X<(D\pi/Z)\times(n+2)-T \quad \text{equation (2)}$$

Figure 7:
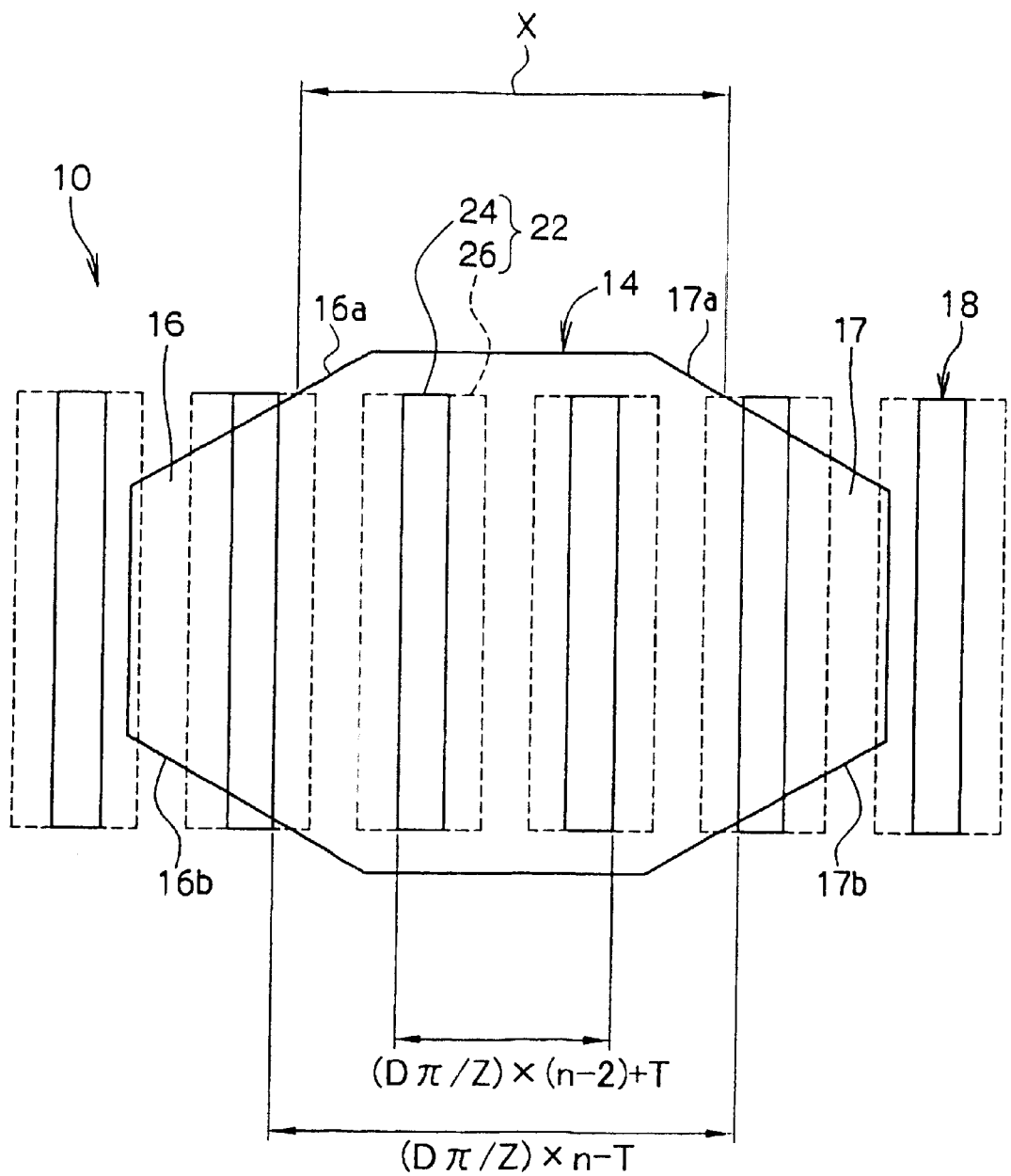
FIG. 7 is another developed view showing a state where the rotor is rotated to make $\pi/Z$ rotation from the state shown in FIG. 6.

Alternatively, in the other case shown in FIG. 7, when the rotor 18 is rotated to make $\pi/Z$ (i.e., one half slot) rotation from the above state shown in FIG. 6 where the one of the teeth 24 is centered on the circumferential center of the range X of the magnet 14, the number of the teeth 24, which are entirely placed in the range X of the magnet 14, is n−1, and none of the teeth 24 faces the circumferential ends of the range X of the magnet 14. This is achieved by satisfying the following condition (condition for stabilizing the magnetic flux) of equation 3.

$$(D\pi/Z)\times(n-2)+T<X<(D\pi/Z)Xn-T \quad \text{equation (3)}$$

Figure 9:
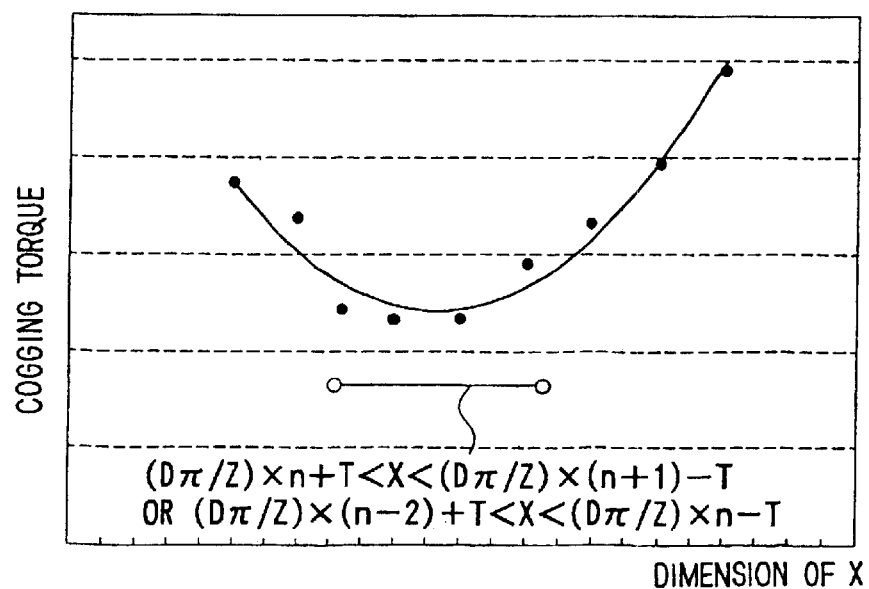
FIG. 9 is a graph showing a relationship between a dimension of X and a generated cogging torque.

Thus, the motor 10 of the present embodiment should satisfy one of the two conditions, i.e., $(D\pi/Z)Xn+T<X<(D\pi/Z)\times(n+1)-T$ in the case of FIGS. 4 and 5, which correspond to the equations 1 and 2, respectively, and $(D\pi/Z)\times(n-1)+T<X<(D\pi/Z)Xn-T$ in the case of FIGS. 6 and 7, which correspond to the equations 1 and 3, respectively. Here, $(D\pi/Z)Xn+T$ in the condition of $(D\pi/Z)Xn+T<X<(D\pi/Z)\times(n+1)-T$ represents the largest lower limit of X selected from the equations 1 and 2 (i.e., selected from $(D\pi/Z)Xn+T$ and $(D\pi/Z)Xn+T$). Furthermore, $(D\pi/Z)\times(n+1)-T$ in the same condition of $(D\pi/Z)Xn+T<X<(D\pi/Z)\times(n+1)-T$ represents the smallest upper limit of X selected from the equations 1 and 2 (i.e., selected from $(D\pi/Z)\times(n+1)-T$ and $(D\pi/Z)\times(n+2)-T$). Also, $(D\pi/Z)\times(n-1)+T$ in the condition of $(D\pi/Z)\times(n-1)+T<X<(D\pi/Z)Xn-T$ represents the largest lower limit of X selected from the equations 1 and 3 (i.e., selected from $(D\pi/Z)\times(n-1)+T$ and $(D\pi/Z)\times(n-2)+T$. Furthermore, $(D\pi/Z)Xn-T$ in the same condition of $(D\pi/Z)\times(n-1)+T<X<(D\pi/Z)Xn-T$ represents the smallest upper limit of X selected from the equations 1 and 3 (i.e., selected from $(D\pi/Z)\times(n+1)-T$ and $(D\pi/Z)Xn-T$). With the above arrangements, the stable states of the magnetic flux can be achieved twice per $2\pi/z$ rotation of the rotor 18 (i.e., per one slot). Thus, as shown in FIG. 9, the cogging torque can be advantageously reduced without causing an undesirable result, such as a reduction in a winding area of the winding in each core, which occurs in the case where the skewed cores are used.

As a result, vibrations of the rotor 18 are advantageously reduced to achieve a relatively high degree of silence during the rotation of the motor 10. Therefore, the ball bearing 28, 29 can be used in each bearing structure of the motor 10 even in the environment where a relatively high degree of silence is required during the rotation of the motor 10.

Furthermore, unlike the case where the slide bearing is used in each baring structure of the motor 10, when the ball bearing is used in the bearing structure of the motor 10, the oil is not required in the contacting portion of the bearing structure, which contacts the drive shaft 20. As a result, disadvantages, which result from the maintenance of the oil and the spill of the oil, can be avoided. Furthermore, the washers or the like are not required. Thus, the bearing structure of the motor 10 and the manufacturing steps of the bearing structure of the motor 10 are substantially simplified.

Also, in the motor 10 of the present embodiment, the wall thickness of each magnet 14 is gradually reduced toward the circumferential ends of the magnet 14. Thus, the attractive force or the repulsive force between the magnets 14 and the rotor 18 does not abruptly change, so that the cogging torque generated in the rotor 18 is advantageously reduced.

If each magnet 14 achieves a high performance (i.e., generating relatively high magnetic force), and thus a size of the magnet 14 can be reduced, it is advantageous to satisfies the condition of $(D\pi/Z) \times (n-1)+T < X < (D\pi/Z) Xn-T$, as in the case of FIGS. 6 and 7 where the size of each magnet 14 is smaller than that of each magnet 14 shown in FIGS. 4 and 5.

Figure 10:
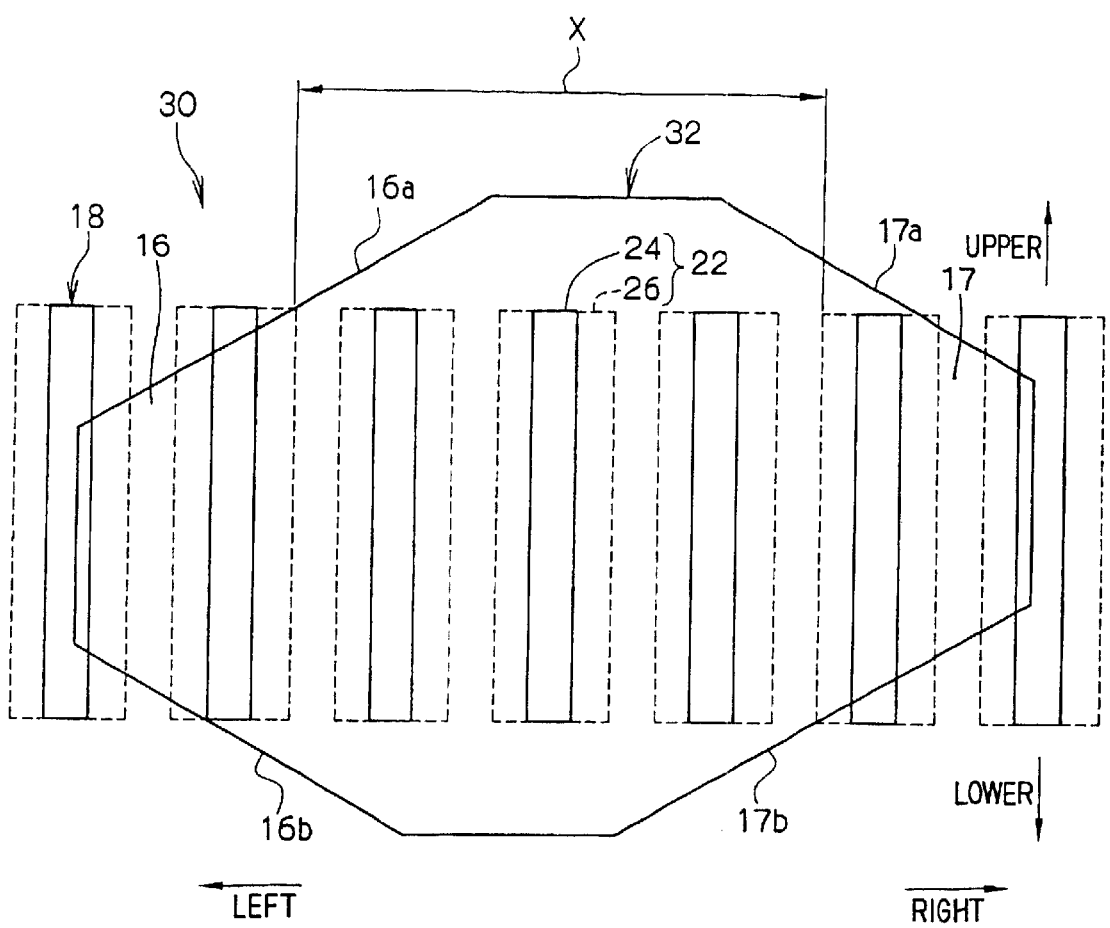
FIG. 10 is a developed view showing a modification of the magnet of the embodiment, in which the magnet is non-symmetrical with respect to its circumferential center line nor with respect to its vertical center line but is symmetrical with respect to its center point.
Figure 11:
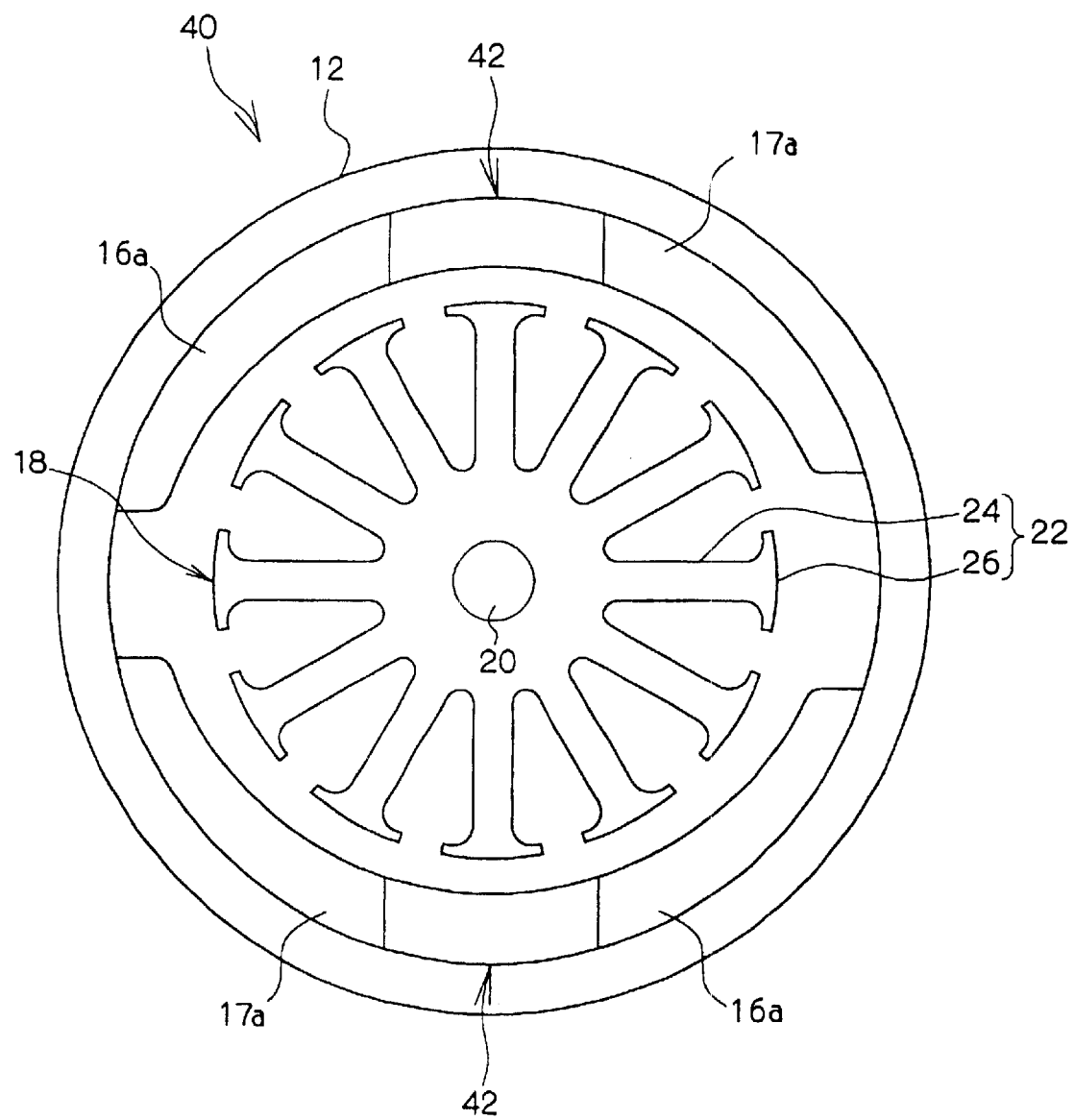
FIG. 11 is a plan view showing another modification of the magnet, in which each magnet is non-symmetrical with respect to its circumferential center line.

Furthermore, in the present embodiment, each magnet 14 is symmetrical with respect to its circumferential center line and also with respect to its vertical center line. However, each magnet can be modified to a magnet 32 of a motor 30 (dynamo-electric machine) shown in FIG. 10. The magnet 32 is non-symmetrical with respect to its circumferential center line nor with respect to a vertical center line but is symmetrical with respect to its center point. Alternatively, each magnet can be modified to a magnet 42 of a motor 40 (dynamo-electric machine) shown in FIG. 11. The magnet 42 is non-symmetrical with respect to its circumferential center line. In the motor 30 shown in FIG. 10, X is the circumferential dimension between the first opposing point of the first tapered surface 16a of the first tapered portion 16 and the second opposing point of the second tapered surface 17b of the second tapered portion 17.

Furthermore, in the present embodiment, the pair of diametrically opposed magnets 14 are provided. The present invention is not limited to this arrangement, and the number of the magnets 14 can be changed to any even number.

Also, in the present embodiment, each tapered surface 16a, 16b, 17a, 17b is planar. However, each tapered surface 16a, 16b, 17a, 17b can be curved.

In the above embodiment, the wall thickness (radial dimension) of each magnet 14 is gradually reduced toward the circumferential ends of the magnet 14. Alternatively, the wall thickness of each magnet 14 can be substantially uniform throughout the magnet 14.

In the above embodiment, the ball bearings 28, 29 are used to rotatably support the drive shaft 20. Alternatively, at least one of the ball bearings 28, 29 can be replaced with a slide bearing(s) to rotatably support the drive shaft 20.

Two comparative examples will be described with reference to FIGS. 12 to 16 to illustrate the advantages of the above embodiment. In these comparative examples, components similar to those discussed in the above embodiment will be indicated with similar numerals and will not be discussed further.

Figure 12:
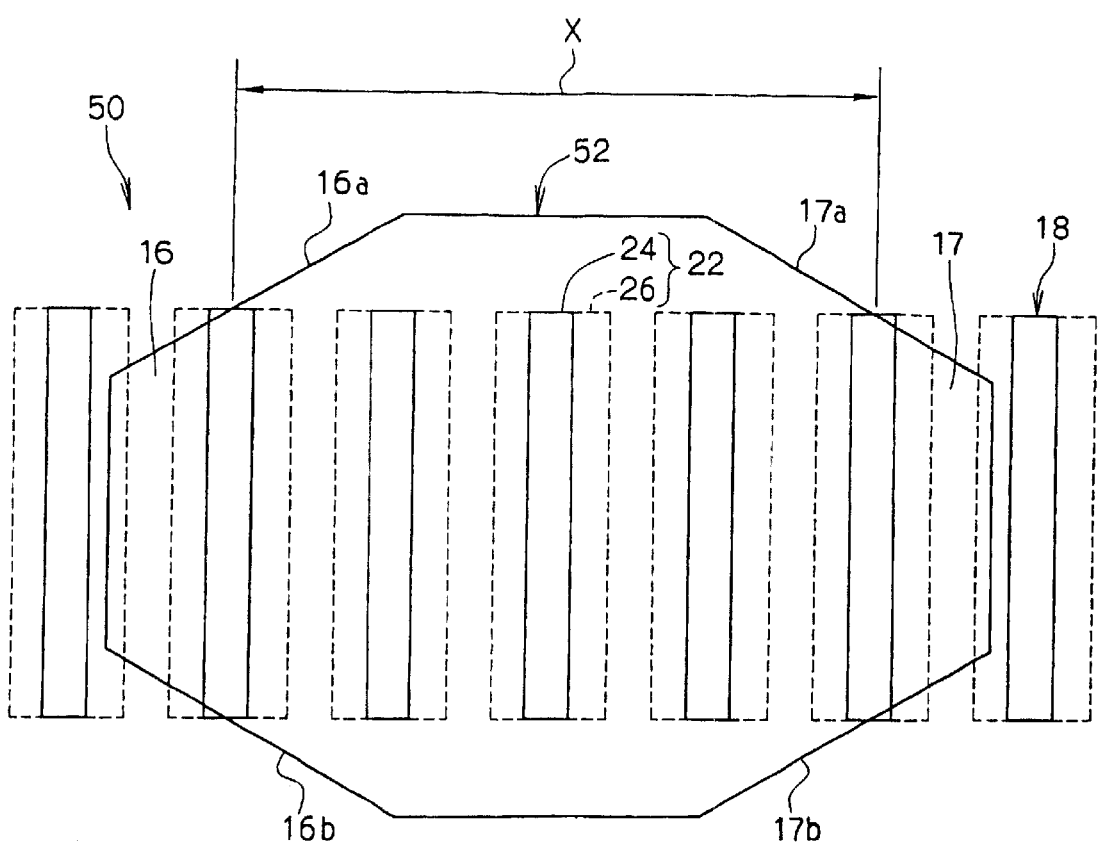
FIG. 12 is a developed view showing a state where one of teeth faces a center of a range X of a magnet of a motor in a first comparative example.
Figure 13:
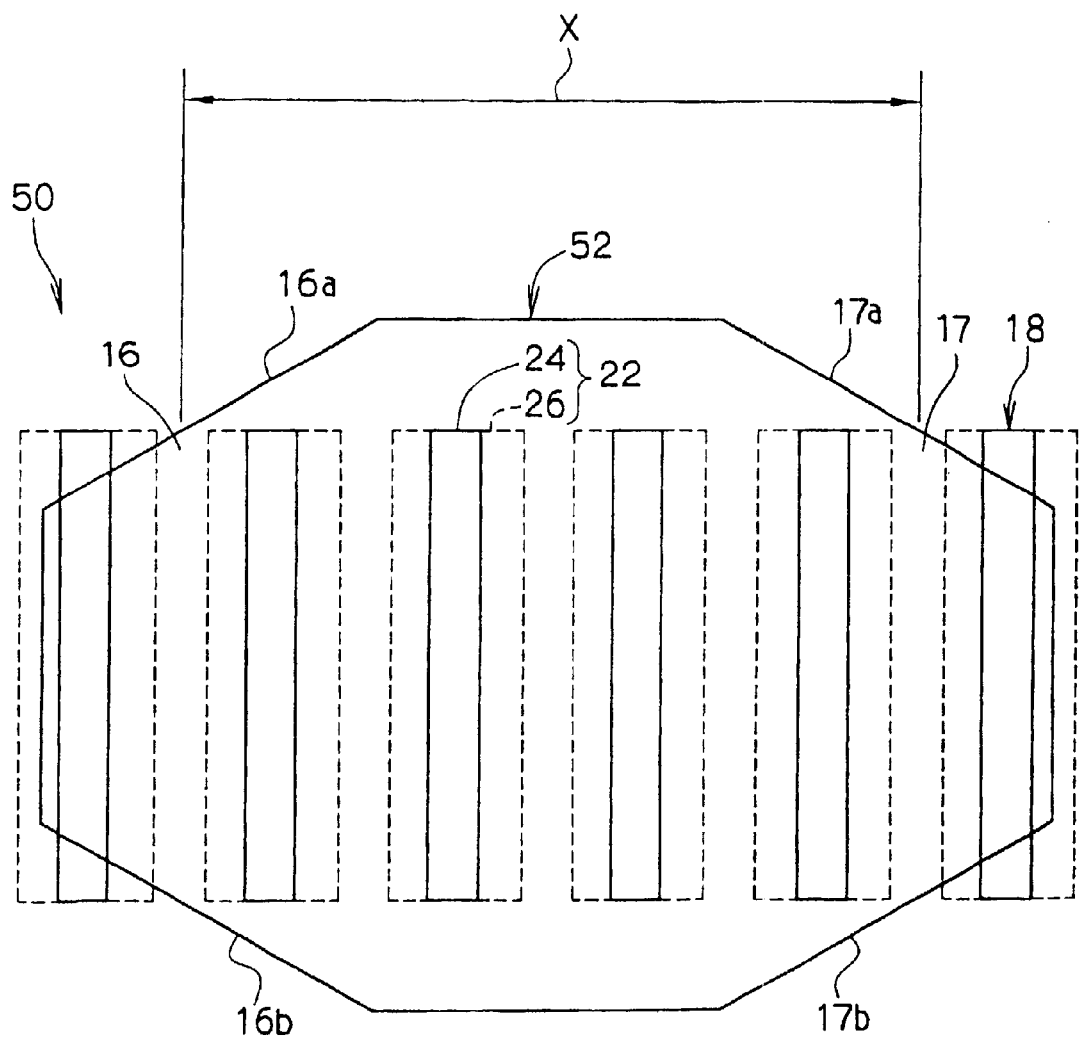
FIG. 13 is a developed view showing a state where the rotor is rotated to make $\pi/Z$ rotation from the state of FIG. 12.

In a motor 50 (dynamo-electric machine) of the first comparative example shown in FIGS. 12 and 13, when one of teeth 24 is centered on a circumferential center of a range X of a magnet 52, two teeth 24 face circumferential ends of the range X of the magnet 52, respectively, resulting in an unstable state of magnetic flux (FIG. 12). At this state, when the rotor 18 is rotated to make $\pi/Z$ (i.e., one half slot) rotation, none of the teeth 24 faces the circumferential ends of the range X of the magnet 52, resulting in a stable state of the magnetic flux (FIG. 13).

Figure 14:
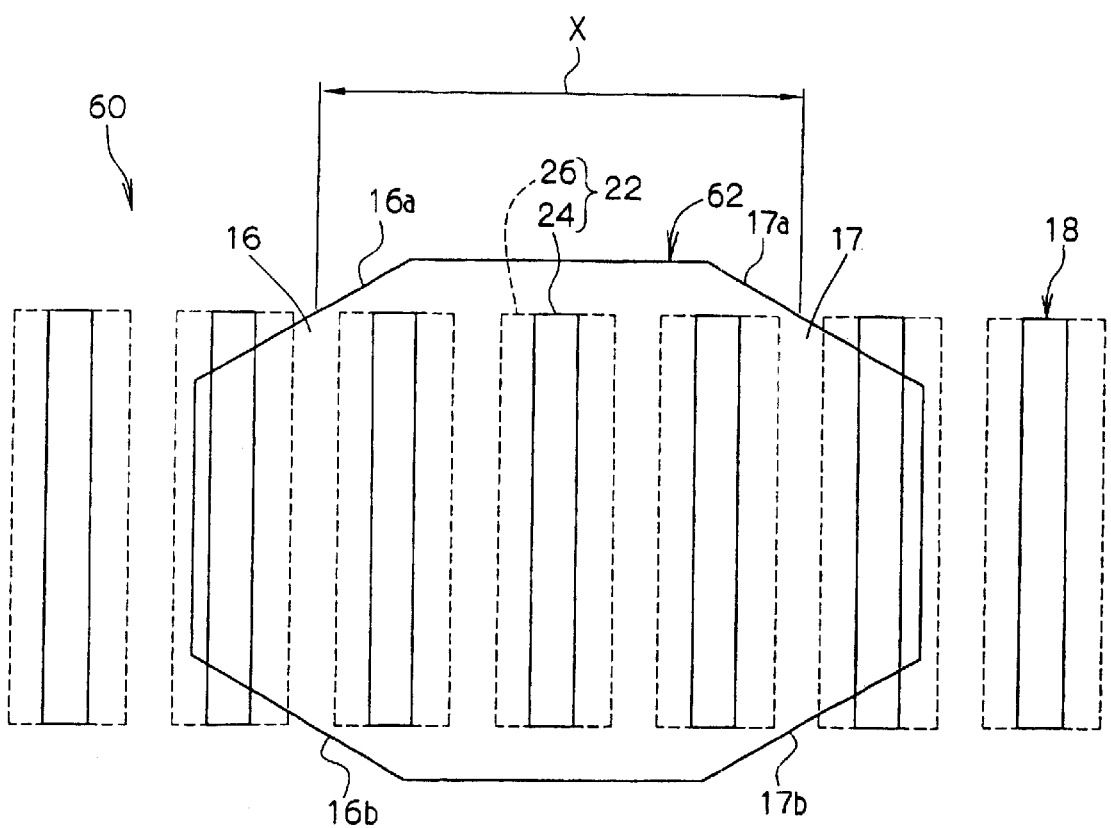
FIG. 14 is a developed view showing a state where one of teeth is centered on a circumferential center of a range X of a magnet of a motor in a second comparative example.
Figure 15:
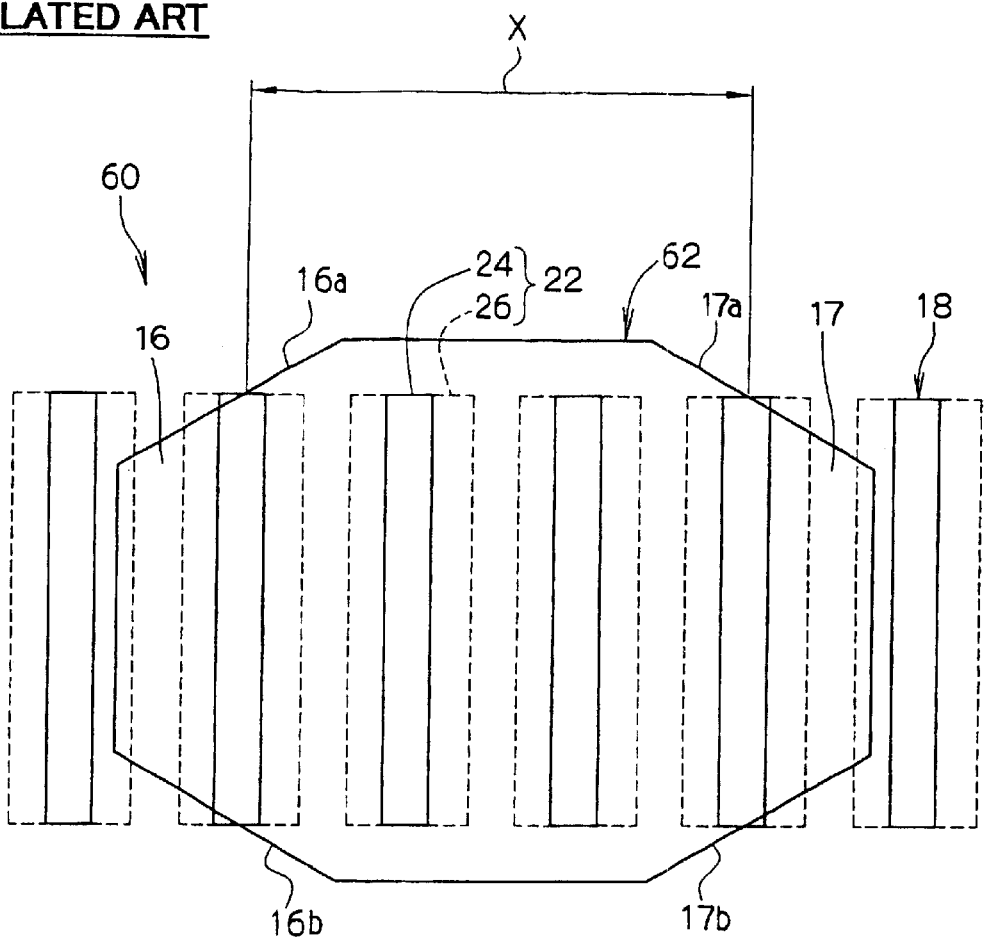
FIG. 15 is a developed view showing a state where the rotor is rotated to make $\pi/Z$ rotation from the state of FIG. 14.

Furthermore, in a motor 60 (dynamo-electric machine) of the second comparative example shown in FIGS. 14 and 15, when one of teeth 24 is centered on a circumferential center of a range X of a magnet 62, none of the teeth 24 faces the circumferential ends of the range X of the magnet 62, resulting in a stable state of magnetic flux (FIG. 14). At this state, when the rotor 18 is rotated to make $\pi/Z$ (i.e., one half slot) rotation, two teeth 24 face circumferential ends of the range X of the magnet 62, respectively, resulting in an unstable state of magnetic flux (FIG. 15).

Thus, as shown in FIG. 16, in these motors 50, 60, the stable state of the magnetic flux occurs only once per $2\pi/Z$ (i.e., one slot) rotation of the rotor 18. As a result, the magnetic flux largely changes between the two successive stable states of the magnetic flux, resulting in generation of a relatively large cogging torque.

Additional advantages and modifications will readily occur to those skilled in the art. The invention in its broader terms is therefore, not limited to the specific details, representative apparatus, and illustrative examples shown and described.

What is claimed is:

1. A dynamo-electric machine comprising: a yoke; a rotor, which is rotatably received in the yoke and includes a predetermined number of cores circumferentially arranged at substantially equal angular intervals, wherein each core includes a tooth, which radially outwardly extends toward the yoke; and a plurality of curved magnets, which are secured to an inner circumferential surface of the yoke, wherein: each magnet has first and second tapered portions, which are tapered in opposite circumferential directions, wherein each of the first and second tapered portions has axially opposed first and second tapered surface of each of the first and second tapered portions decreases toward an outer circumferential end of each of the first and second tapered portions, wherein the first tapered surface of each of the first and second tapered portions has a first opposing point, which is radially opposed to a first imaginary end circle defined by outer peripheral surfaces of the cores at one axial ends of the cores, and the second tapered surface of each of the first and second tapered portions has a second opposing point, which is radially opposed to a second imaginary end circle defined by the outer peripheral surfaces of the cores at the other axial ends of the cores; and the rotor and each magnet are configured to satisfy one of the following conditions:

$(D\pi/Z) \times n+T < X < (D\pi/Z) \times (n+1)-T$; and $(D\pi/Z) \times (n-1)+T < X < (D\pi/Z) \times n-T$, wherein Z is a number of the cores of the rotor, D is an outer diameter of the rotor, T is circumferential dimension of each tooth, X is a circumferential dimension between a circumferentially innermost one of the first and second opposing points of the first tapered portion and a circumferentially innermost one of the first and second opposing points of the second tapered portion when each magnet is viewed from a radial direction, and n is the number of the teeth that are entirely placed within a range defined by X when a circumferential center of one of the teeth is radially oposed to a circumferential center of the range defined by X, wherein more than one minimum point of cogging torque occurs per $2\pi/Z$ rotation of the rotor.

2. A dynamo-electric machine according to claim 1, wherein two minimum points of cogging torque occur per $2\pi/Z$ rotation of the rotor.

3. A dynamo-electric machine according to claim 1, further comprising:
a drive shaft, which extends along a rotational axis of the rotor and is secured to the rotor to rotate integrally with the rotor; and
at least one ball bearing, which rotatably supports the drive shaft.

4. A dynamo-electric machine according to claim 1, wherein each tooth axially extends along a line parallel to an axial direction of the rotor.

5. A dynamo-electric machine according to claim 1, wherein a radial dimension of each magnet is substantially uniform throughout each magnet.

* * * * *